Sept. 29, 1953

E. TESTORI 2,653,490

PROGRESSIVE VARIABLE SPEED DRIVE
CAPABLE OF REVERSE ROTATION

Filed May 29, 1951

INVENTOR:
EDOARDO TESTORI,

BY

*Ernest B. Marmorek*,
HIS AGENT.

Sept. 29, 1953     E. TESTORI     2,653,490
PROGRESSIVE VARIABLE SPEED DRIVE
CAPABLE OF REVERSE ROTATION Filed May 29, 1951     2 Sheets-Sheet 2

INVENTOR:
EDOARDO TESTORI,

BY

HIS AGENT.

Patented Sept. 29, 1953

2,653,490

UNITED STATES PATENT OFFICE 2,653,490

PROGRESSIVE VARIABLE SPEED DRIVE
CAPABLE OF REVERSE ROTATION

Edoardo Testori, Milan, Italy

Application May 29, 1951, Serial No. 228,866
In Italy January 24, 1951

2 Claims. (Cl. 74—689)

The present invention concerns a progressive variable speed drive by which it is even possible to reach a zero speed on the driven shaft, while the driving shaft rotates at any whatever speed, and which allows also to reverse the direction of rotation. One of the advantages of this variable speed drive is that same is very simple, in construction gives a very good performance, and is of very compact design so as to lend itself advantageously for all those applications where it is wanted to obtain a progressive, adjustable speed variation, from a positive maximum to a negative maximum.

The variable speed drive according to the invention is characterized by the fact that on the driving shaft there is fixed a two arm bracket each end of which is fast with a shaft carrying rigidly at one side a variable transmission member, apt to be coupled with a similar aligned member mounted on the other shaft, symmetrical to the first one, and at the other side a gear wheel, one of these gears meshing with a stationary central gear fixed on the frame, and about which the assembly rotates with a planetary motion, while the other gear meshes with a gear fast with the driven shaft, that is mounted coaxially and internally to said central stationary gear, there being provided a device apt to vary the transmission ratio between the two variable transmission members coupled to each other, during the operation of the whole unit.

In one of the possible practical embodiments, the two variable transmission members can be constituted by two adjustable groove V-pulleys. It is however obvious that these pulleys may be eventually substituted by other members such as gear wheels and the like, provided with devices allowing to vary the transmission ratio during the operation of the drive unit.

The accompanying drawing represents diagrammatically by way of an example a form of embodiment of the present invention and namely:

Figures 1, 2:
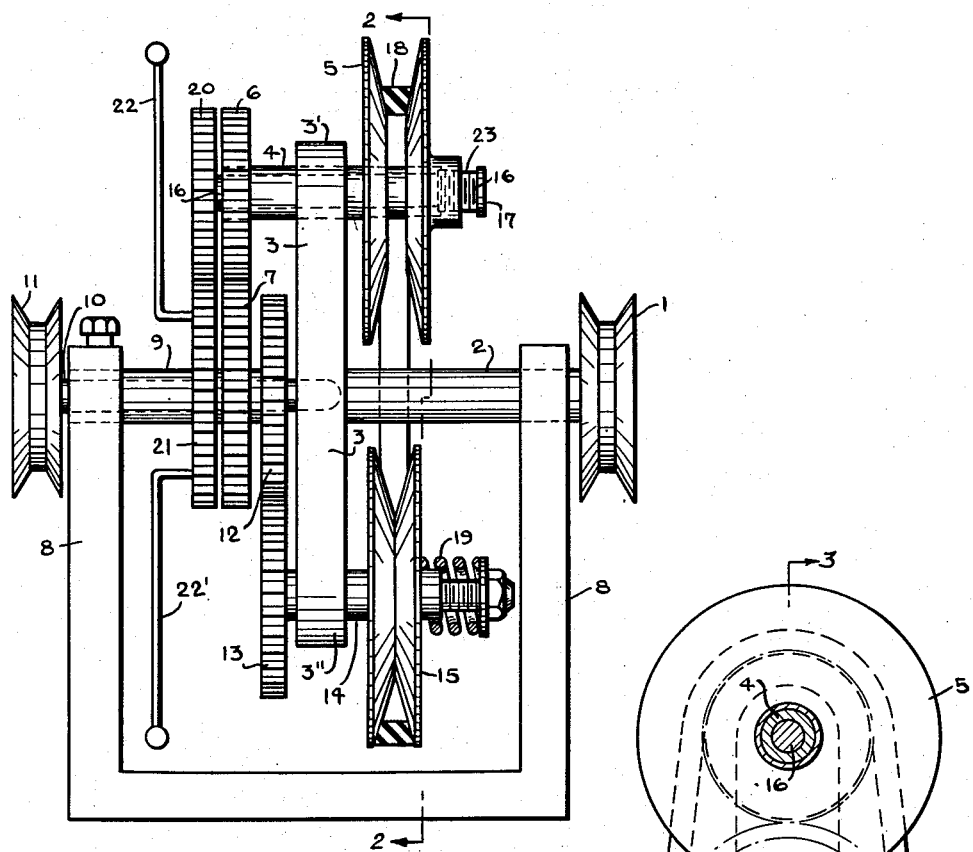
Fig. 1 is a schematic side view of the variable speed drive.
Fig. 2 is a sectional view taken along line 2—2 of Fig. 1.

As it is apparent from the drawing, the variable speed drive comprises a driving pulley 1, keyed on the driving shaft 2, that carries at its other end a two arm bracket 3, the end 3' whereof forms a journal bearing for a shaft 4, carrying at one end an adjustable sheave 5, and at its other end a gear wheel meshing with a central stationary gear 7, mounted fast on the transmission frame 8, on a stationary shaft 9 of same. This shaft 9 is hollow and carries internally the driven shaft 10 on which is rigidly mounted the driven pulley 11. At the other end of the driven shaft 10 there is keyed a gear wheel 12 meshing with another gear 13 keyed on the end of shaft 14, journalled on the other end 3'' of the two arm bracket 3. This shaft 14 carries at its end opposite the one carrying gear wheel 13, the other adjustable sheave 15, which is aligned with the first adjustable sheave 5, mounted on the other end 3' of the bracket 5. In this form of embodiment, the driving shaft 2 and the driven shaft 10 are assembled coaxially endwise, and a projection 10' on shaft 10 constitutes a free running pivot for bracket 3.

In order to vary the transmission ratio between the two adjustable sheaves 5 and 15, there is provided a hollow shaft 4. Inside of same fits a spindle 16 with an external screw thread so as to engage in the corresponding screw thread provided on the inside of shaft 4. The end of spindle 16, situated on the same side as the adjustable sheave 5 carries a yoke 17 having the purpose of acting on one of the sides of sheave 5 so as to push it away from the other side, thereby allowing the V-belt 18 to penetrate further inside, thus reducing the operating radius, thereof which instead is correspondingly increased on the other adjustable sheave 15, that is subjected to the action of a spring 19. The spindle 16, passing through the hollow shaft 4, carries at its other end a gear wheel 20 meshing with a second gear wheel 21 assembled freely rotatable on the stationary shaft 9, whereon is rigidly mounted the central stationary gear 7. Gear wheel 21 is provided with control levers 22—22' that allow to angularly vary its position. This angular adjustment is transmitted to gear 20 and consequently to the spindle 16, which by means of its screw thread 23 causes the lateral spreading of one of the sides of the adjustable sheave 5. The central gear 21 carrying the two levers 22—22' for controlling the variation of the transmission ratio between sheaves 5 and 15, has the same diameter as the central stationary gear 7. Gear wheels 12 and 13 too have the same diameter.

Figure 3:
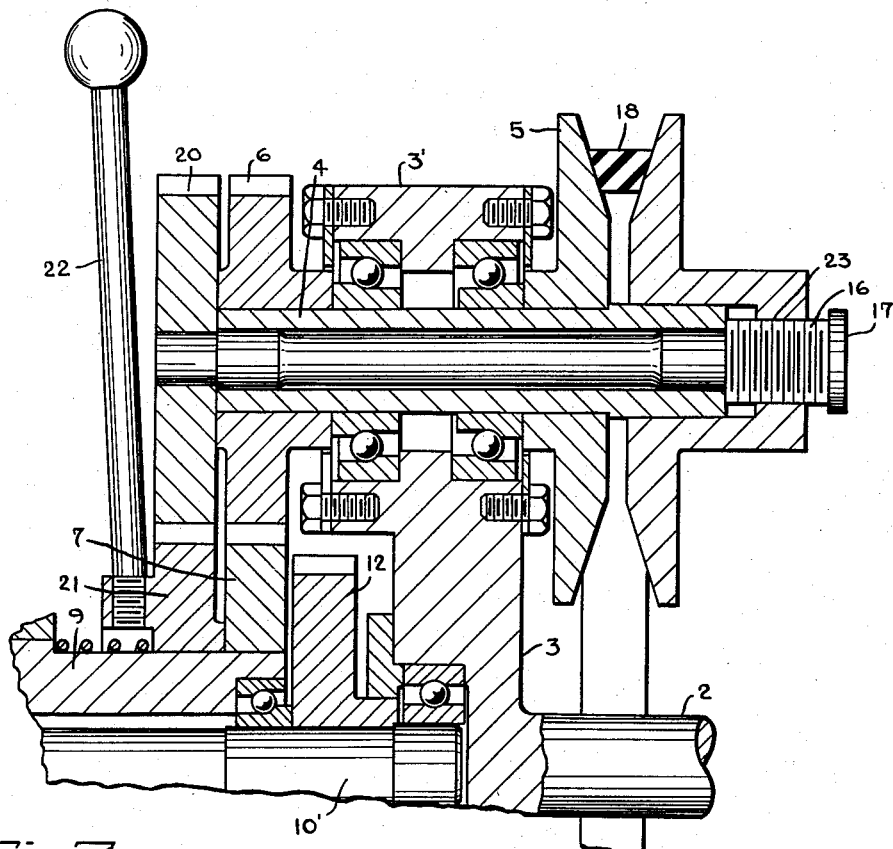
Fig. 3 is a large-scale fragmentary sectional view taken on line 3—3 of Fig. 2.

While the parts of the device are shown in a schematic way in Fig. 1, their actual shape and positioning have been illustrated in Fig. 3.

The operation of the variable speed drive is as follows:

The rotation of pulley 1 and shaft 2 is transmitted through bracket 3 to gear wheel 6, that rotates in a planetary way about the central stationary gear 7, carrying in rotation the assembly of sheaves 5 and 15, between which there is a predetermined transmission ratio, controlled by means of levers 22—22', gear wheels 21 and 20, and spindle 16. Consequently, sheave 15 will run at a certain speed that is transmitted to gear wheel 13 and from same to gear wheel 12 and the driven shaft 10. It is apparent that, by suitably varying the transmission ratio between sheaves 5 and 15, it will be possible to even attain a zero speed on shaft 10, and further, also a reversal of rotation.

It is apparent that the arrangement illustrated and described for obtaining the variation of the transmission ratio between sheaves 5 and 15 may be substituted by other equivalent mechanical devices.

What I claim is:

1. In a variable speed drive including a frame, in combination, a driving shaft and a driven shaft journalled on said frame and transmission means therebetween comprising a two-armed lever secured on said driving shaft and rotatable therewith, a rotatable auxiliary first shaft journalled in one arm of said lever, a rotatable auxiliary second shaft journalled in the other arm of said lever, said auxiliary shafts being revoluble in planetary rotation each about its own axis and about said driving shaft, a gear secured on each auxiliary shaft and rotatable therewith, a stationary pinion fixed on said frame and being in mesh with the gear of said first shaft, whereby rotation will be imparted to said first shaft about its axis when said driving shaft is turned, an adjustable pulley secured to each auxiliary shaft and revoluble therewith, a belt suspended between said pulleys, each pulley having a part movable axially of its shaft for adjustment of the position of the belt, said belt and pulleys being operable for transmitting rotation from said first to said second shaft to rotate the gear of said second shaft at variable speed depending on the position of said movable parts of said pulleys, a pinion mounted on said driven shaft and in mesh with said gear of said second shaft to be turned thereby, a mechanism connected to the movable pulley part of said first shaft and actuable to move said part for adjustment of the pulley thereof to change the position of the belt for speed transmission variation, and resilient means connected to the movable part of the opposite pulley urging the pulley to hold the belt in a normal position and to yield for belt support in all belt positions.

2. In a variable speed drive, as claimed in claim 1, said first shaft being hollow and having a thread formed on its interior, said mechanism comprising a screw disposed in said hollow first shaft and engaging the thread thereof and being turnable for movement axially of said first shaft, means on one end of said screw and connected to said movable part of the pulley of said first shaft, a control gear connected to said screw, and a freely turnable control pinion mounted on said frame and in mesh with said control gear, said gears of said first shaft and screw being co-axial and having the same size, and said pinions on said frame being co-axial and having the same size, whereby said control pinion during operation of the drive will normally be at rest and turning of said control pinion will turn said screw to adjust the pulley of said first shaft.

EDOARDO TESTORI.

References Cited in the file of this patent

UNITED STATES PATENTS

| Number | Name | Date |
|---|---|---|
| 2,259,823 | Locke | Oct. 21, 1941 |